(12) United States Patent
Qiu et al.

(10) Patent No.: US 10,480,574 B2
(45) Date of Patent: Nov. 19, 2019

(54) ADJUSTABLE LUBRICATION MODULE OF LINEAR GUIDEWAY

(71) Applicant: HIWIN TECHNOLOGIES CORP., Taichung (TW)

(72) Inventors: Yu-Ting Qiu, Taichung (TW); Yuan-Ling Ruan, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 0 days.

(21) Appl. No.: 15/864,386

(22) Filed: Jan. 8, 2018

(65) Prior Publication Data

US 2019/0211872 A1    Jul. 11, 2019

(51) Int. Cl.
*F16C 29/06* (2006.01)
*F16C 33/66* (2006.01)

(52) U.S. Cl.
CPC ...... *F16C 29/0647* (2013.01); *F16C 29/0609* (2013.01); *F16C 33/6681* (2013.01)

(58) Field of Classification Search
CPC ............... F16C 29/005; F16C 29/0609; F16C 29/0633–0673
See application file for complete search history.

(56) References Cited

U.S. PATENT DOCUMENTS

| | | | | |
|---|---|---|---|---|
| 9,234,544 | B2 * | 1/2016 | Hsieh | F16C 33/6674 |
| 9,528,553 | B2 * | 12/2016 | Nishiyama | F16C 33/6659 |
| 2006/0231335 | A1 * | 10/2006 | Lin | F16C 29/0609 |
| | | | | 184/5 |

FOREIGN PATENT DOCUMENTS

| | | |
|---|---|---|
| DE | 102013113099 B3 | 11/2014 |
| JP | S59-103927 U | 7/1984 |
| JP | H07-317761 A | 12/1995 |
| JP | 2008-164160 A | 7/2008 |
| JP | 2008-240925 A | 10/2008 |
| JP | 2015-64078 A | 4/2015 |
| JP | 2015-218882 A | 12/2015 |
| TW | M503492 U | 6/2015 |

* cited by examiner

*Primary Examiner* — James Pilkington

(74) *Attorney, Agent, or Firm* — Muncy, Geissler, Olds & Lowe, P.C.

(57) ABSTRACT

An adjustable lubrication module of a linear guideway includes an end lid disposed at a slider and an oil scraper disposed at the end lid. The end lid has therein two opposing backflow-chambers. A feed-hole disposed between the backflow-chambers and an oil-guiding conduit disposed below the feed-hole are disposed on the end lid. Communication between the feed-hole and the oil-guiding conduit is achieved by a primary oiling-channel. Communications between the oil-guiding conduit and the backflow-chambers are achieved by a secondary oiling-channel. Therefore, oiling-channel adjustment performed on the adjustable lubrication module operating in conjunction with the linear guideway does not entail demounting the end lid from the slider, thereby preventing ball missing. The feed-hole and the oil-guiding conduit are not disposed at the junction of the end lid and the slider; hence, lubrication oil is prevented from flowing over the gap between the end lid and the slider.

6 Claims, 14 Drawing Sheets

ADJUSTABLE LUBRICATION MODULE OF LINEAR GUIDEWAY

BACKGROUND OF THE INVENTION

1. Technical Field

The present invention relates to linear guideways and, more particularly, to an adjustable lubrication module of a linear guideway.

2. Description of Related Art

A linear guideway in operation must be sufficiently lubricated to prevent friction from taking place between components and thereby causing a loss of energy. A conventional linear guideway is characterized in that two opposing oiling channels disposed in two end lids disposed at two ends of a slider so that, upon its admission to a feed hole, lubrication oil is shunted leftward and rightward to left and right backflow ducts via the two oiling channels to lubricate rolling components in the backflow ducts, respectively. The linear guideway is mounted horizontally, obliquely, or upside down, or is side-mounted. When the linear guideway is side-mounted, the two oiling channels do not lie at the same height; as a result, upon its admission to the feed hole, the lubrication oil goes to the lower oiling channel more than the higher oiling channel under gravity, and in consequence the rolling components in the high-lying backflow ducts are insufficiently lubricated.

To solve the aforesaid problems, Taiwan patent M503492 discloses a linear guideway which comprises an oiling channel plate and an oiling channel switch plate. The oiling channel plate has a feed hole. A thick duct and a thin duct are disposed on the left and right of the feed hole, respectively. The thick and thin ducts disposed on the same side are vertically aligned. The thick and thin ducts disposed on the left and right sides are alternately arranged. The oiling channel switch plate has an end surface provided with a first connection passage and another end surface provided with a second connection passage. By turning the oiling channel switch plate over, the first connection passage becomes connected to the feed hole, left thick duct, and right thin duct, or the second connection passage becomes connected to the feed hole, right thick duct, and left thin duct. However, Taiwan patent M503492 has a drawback as follows: with the oiling channel switch plate being positioned proximate to a slider, lubrication oil flows over the upper junction of the oiling channel switch plate and the slider while oil feeding is ongoing, thereby bringing inconvenience to users.

BRIEF SUMMARY OF THE INVENTION

The main objective of the present invention is to provide an adjustable lubrication module of a linear guideway so that mounting and demounting processes thereof do not lead on to ball missing or lubrication oil leakage.

In order to achieve the above and other objectives, the present invention provides an adjustable lubrication module which comprises an end lid and an oil scraper. The end lid is disposed on an end surface of a slider. The end lid has two opposing backflow chambers, a feed hole, an oil-guiding conduit, a primary oiling channel, and two opposing secondary oiling channels. The feed hole and the oil-guiding conduit are disposed on an end surface of the end lid, with the end surface facing away from the slider. The feed hole is farther from a rail of a linear guideway than the oil-guiding conduit. Two ends of the primary oiling channel are in communication with the feed hole and the oil-guiding conduit, respectively. Two ends of each said secondary oiling channel are in communication with the oil-guiding conduit and one of the backflow chambers, respectively. The oil scraper is disposed on an end surface of the end lid, with the end surface facing away from the slider, and has an oil feeding inlet. The oil feeding inlet is in communication with the feed hole of the end lid.

Therefore, oiling channel adjustment performed on an adjustable lubrication module operating in conjunction with the linear guideway according to the present invention does not entail demounting the end lid from the slider and thus can prevent ball missing. Moreover, the feed hole and the oil-guiding conduit are not disposed at the junction of the end lid and the slider, thereby preventing lubrication oil from flowing over the gap between the end lid and the slider.

Preferably, the adjustable lubrication module further has an oil stopping component for adjusting the flow rate of lubrication oil. The oil stopping component is demountably disposed in the oil-guiding conduit of the end lid and between the primary oiling channel of the end lid and one of the secondary oiling channels of the end lid to address the issue that the two secondary oiling channels lie at different heights when the linear guideway is side-mounted.

Preferably, the end lid is integrally formed. A receiving chamber is disposed on an end surface of the end lid, and the end surface of the end lid faces away from the slider. An oil-guiding conduit is disposed on the wall of the receiving chamber. A receiving portion is disposed on an end surface of the oil scraper, and the end surface of the oil scraper faces the end lid. The receiving portion is fitted in the receiving chamber of the end lid so that the oil scraper further enhances the hermetic seal provided to the oil-guiding conduit.

Preferably, the end lid is a two-piece structure. The end lid has an end lid body and an oil-guiding plate. The end lid body is disposed on an end surface of the slider and has the two backflow chambers, the feed hole, the primary oiling channel, and the two secondary oiling channels. A receiving chamber is disposed on an end surface of the end lid body, and the end surface of the end lid body faces away from the slider. The receiving chamber is in communication with the primary oiling channel and the two secondary oiling channels. The oil-guiding plate is fitted in the receiving chamber of the end lid body. An oil-guiding conduit is disposed on an end surface of the oil-guiding plate, and the end surface of the oil-guiding plate faces the end lid. After the oil-guiding plate has been mounted on the end lid body, the oil-guiding conduit is in communication with the primary and secondary oiling channels of the end lid body.

Preferably, the end lid is a two-piece structure. The end lid has an end lid body and an outer end lid. The end lid body is disposed on an end surface of the slide and has the primary oiling channel and the two secondary oiling channels. A feed hole and a receiving chamber disposed below the feed hole are disposed on an end surface of the end lid body, with the end surface facing away from the slider. The receiving chamber is in communication with the primary oiling channel and the two secondary oiling channels. A first half-oil-guiding conduit and two opposing first half-backflow chambers are disposed on the wall of the receiving chamber. The outer end lid is fitted in the receiving chamber of the end lid body. Two opposing second half-backflow chambers and a second half-oil-guiding conduit are disposed on an end surface of the outer end lid, with the end surface facing the end lid body. Therefore, after the outer end lid has been mounted on the end lid body, the two second half-backflow chambers of the outer end lid are connected to the first half-backflow chambers of the end lid body, respectively, to form a backflow chamber. Moreover, the second half-oil-guiding conduit of the outer end lid and the first half-oil-guiding conduit of the end lid body are connected so as to form an oil-guiding conduit therebetween, which is applicable to a downsized linear guideway.

DETAILED DESCRIPTION OF THE INVENTION

The technical solution and features of the present invention are further described below with reference to accompanying drawings and preferred embodiments of the present invention. Directional words, including "left," "right," "in," "outer," "upper" and "lower," used in describing the preferred embodiments of the present invention are illustrative of directions normally applicable in the accompanying drawings rather than restrictive of the claims of the present invention.

Figure 1:
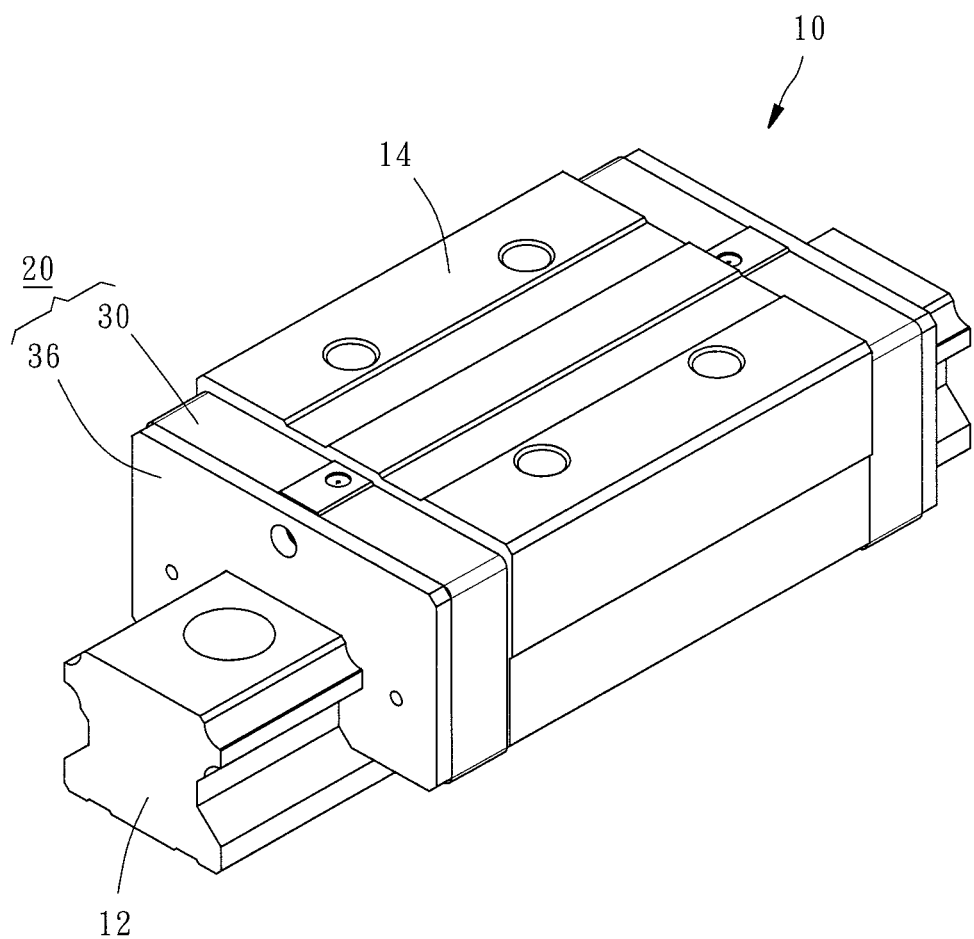
FIG. 1 is a perspective view of an adjustable lubrication module operating in conjunction with a linear guideway horizontally mounted according to the first embodiment of the present invention.
Figure 2:
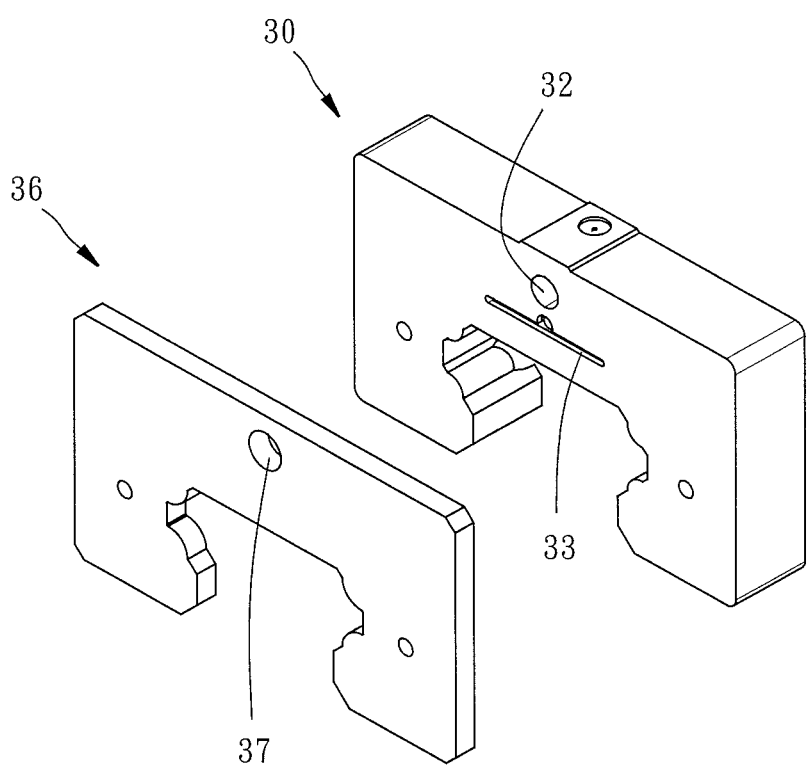
FIG. 2 is a perspective exploded view of the adjustable lubrication module according to the first embodiment of the present invention.

Referring to FIG. 1, a linear guideway 10 comprises a rail 12 and a slider 14 slidably disposed at the rail 12. Referring to FIG. 2, an adjustable lubrication module 20 comprises an end lid 30 and an oil scraper 36 according to the first embodiment of the present invention.

Figure 3:
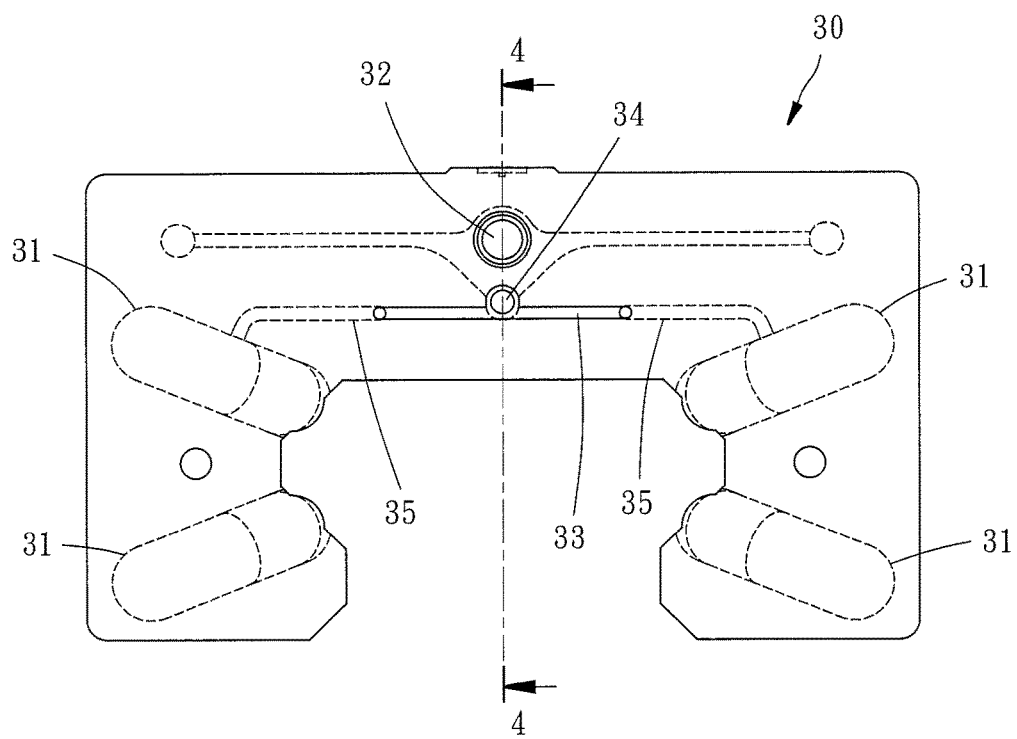
FIG. 3 is a plan of an end lid of the adjustable lubrication module according to the first embodiment of the present invention.
Figure 4:
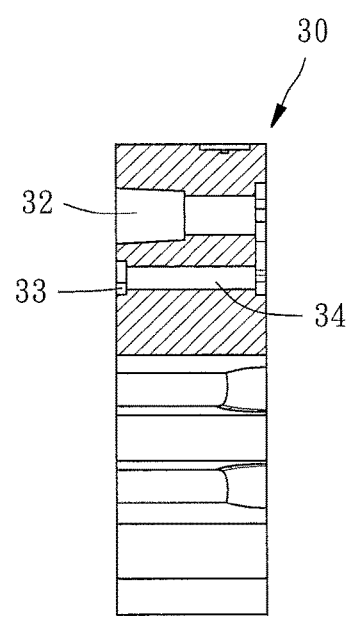
FIG. 4 is a cross-sectional view taken along line 4-4 of FIG. 3.

The end lid 30 is slidably disposed at the rail 12 and connected to an end surface of the slider 14. Referring to FIG. 3, the end lid 30 has therein two backflow chambers 31. The two backflow chambers 31 are disposed at two opposing long sides of the rail 12 to enable backflow to occur to rolling components (not shown) disposed between the rail 12 and the slider 14. Referring to FIG. 3 and FIG. 4, in this embodiment, the end lid 30 is integrally formed and has an outer end surface (which faces away from the slider 14) provided with a feed hole 32 and an oil-guiding conduit 33. The oil-guiding conduit 33 is disposed below the feed hole 32 so that the oil-guiding conduit 33 is closer to the rail 12 than the feed hole 32. Moreover, as shown in FIG. 3 and FIG. 4, a primary oiling channel 34 and two opposing secondary oiling channels 35 are disposed in the end lid 30. The primary oiling channel 34 is U-shaped. The two ends of the primary oiling channel 34 are in communication with the feed hole 32 and the middle of the oil-guiding conduit 33, respectively. The two ends of each secondary oiling channel 35 are in communication with one end of the oil-guiding conduit 33 and one of the backflow chambers 31, respectively.

The oil scraper 36 is slidably disposed at the rail 12 and covers the outer end surface of the end lid 30 to provide a hermetic seal to the oil-guiding conduit 33. The oil scraper 36 has an oil feeding inlet 37 which penetrates two (inner and outer) lateral surfaces of the oil scraper 36. The oil feeding inlet 37 of the oil scraper 36 is in communication with the feed hole 32 of the end lid 30.

Figure 5:
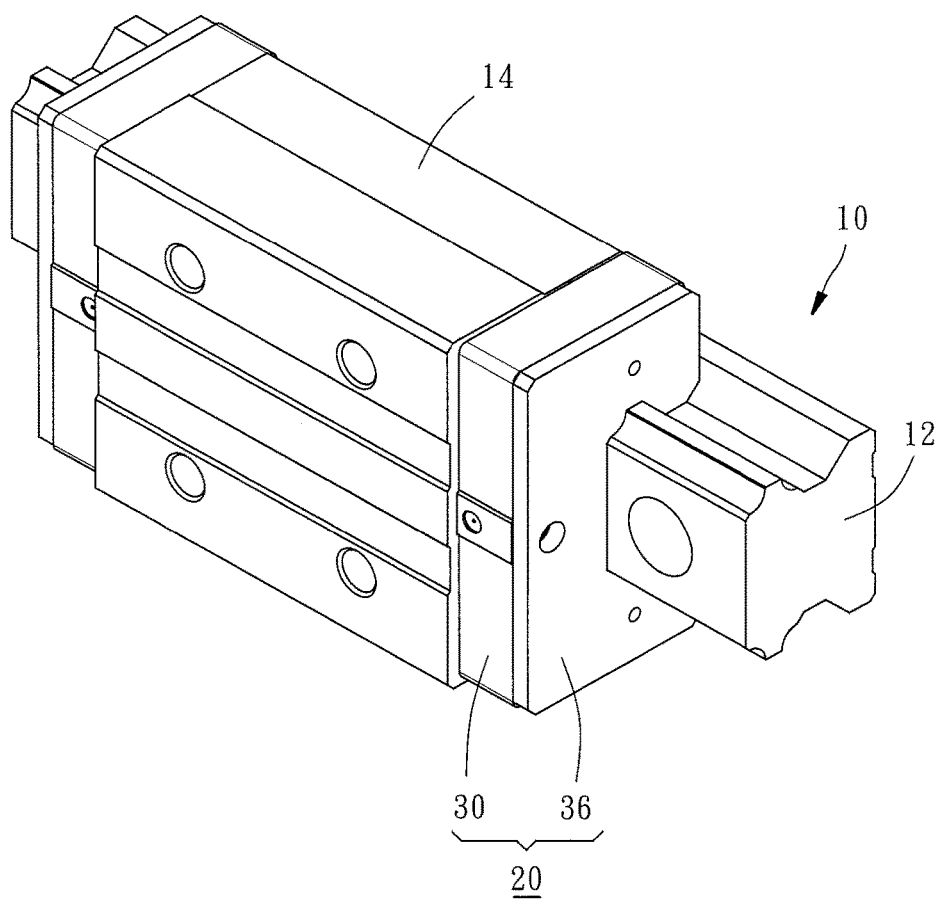
FIG. 5 is a perspective view of the adjustable lubrication module operating in conjunction with the linear guideway side-mounted according to the present invention.
Figure 6:
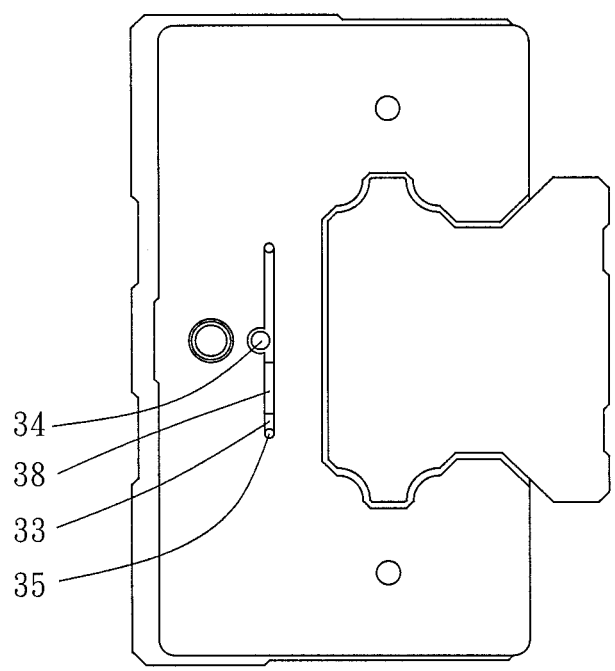
FIG. 6 is a plan of an oil stopping component of the adjustable lubrication module shown in FIG. 5, but omitting an oil scraper.

As illustrated by the aforesaid structures, when the linear guideway 10 horizontally mounted as shown in FIG. 1 is fed with oil from the oil feeding inlet 37 of the oil scraper 36 as shown in FIG. 3 and FIG. 4, lubrication oil flows from the feed hole 32 of the end lid 30, along the primary oiling channel 34, to the oil-guiding conduit 33, then flows to the two secondary oiling channels 35 on the left and on the right, respectively, through the oil-guiding conduit 33, and finally flows to the two (left and right) backflow chambers 31 through the two secondary oiling channels 35, respectively, to effectuate lubrication. Referring to FIG. 5 which shows that the linear guideway 10 is side-mounted and fed with oil, with the two secondary oiling channels 35 lying at different heights to prevent the lubrication oil from flowing to the low-lying secondary oiling channels 35 excessively, the oil scraper 36 must be demounted before the linear guideway 10 starts to operate, and then an oil stopping component 38 (wool felt in this embodiment) is mounted inside the oil-guiding conduit 33 so that, as shown in FIG. 6, the oil stopping component 38 is disposed between the primary oiling channel 34 and the low-lying secondary oiling channels 35. Hence, the flow rate of the lubrication oil is adjusted with the oil stopping component 38 so that the lubrication oil flows equally to the upper and lower backflow chambers 31. Finally, the oil scraper 36 is mounted in place again before the linear guideway 10 starts to operate.

Figure 7:
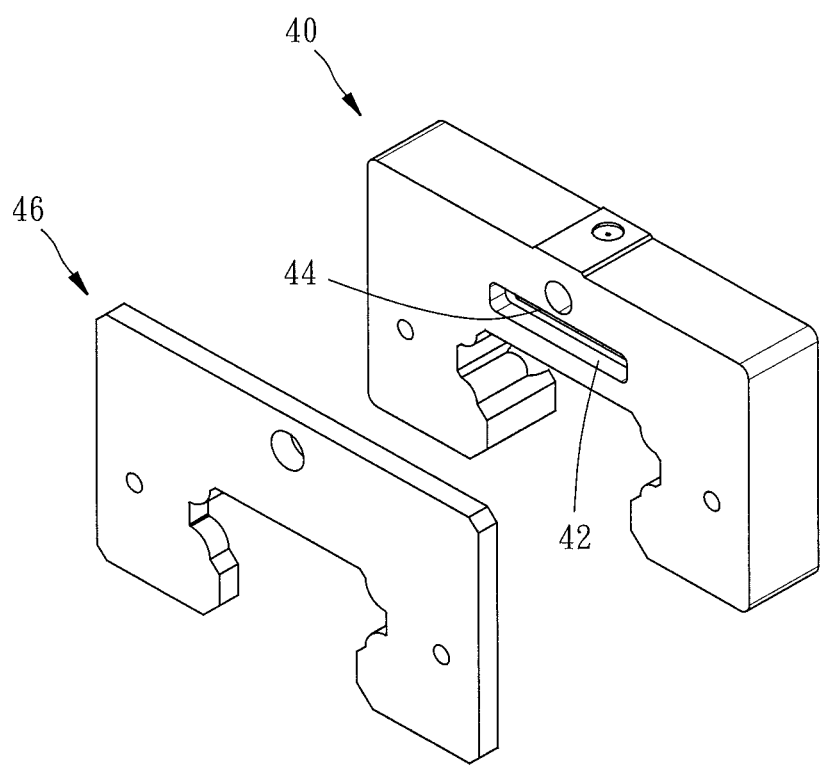
FIG. 7 is a perspective exploded view of the adjustable lubrication module according to the second embodiment of the present invention.
Figure 8:
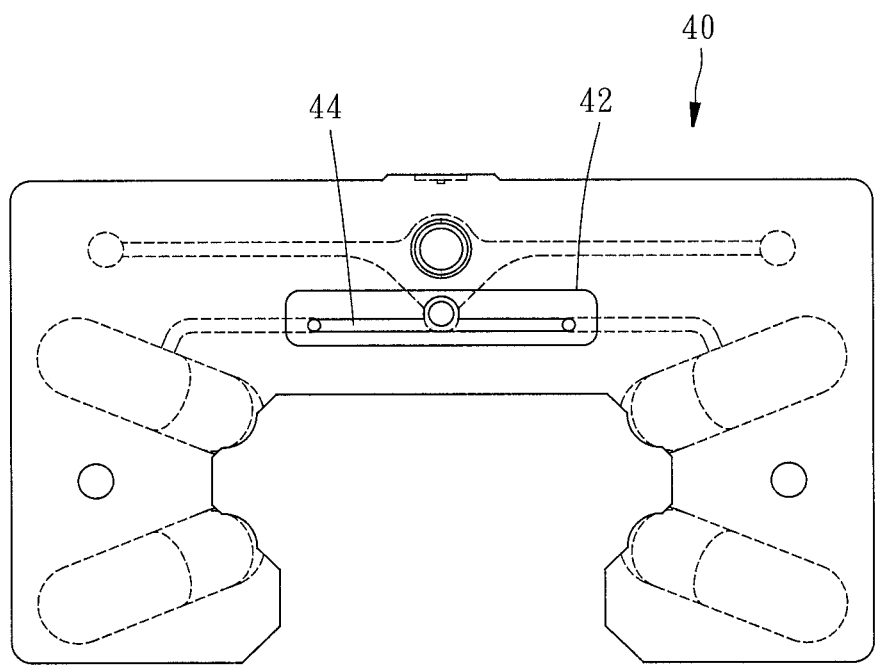
FIG. 8 is a plan of an end lid of the adjustable lubrication module according to the second embodiment of the present invention.
Figure 9:
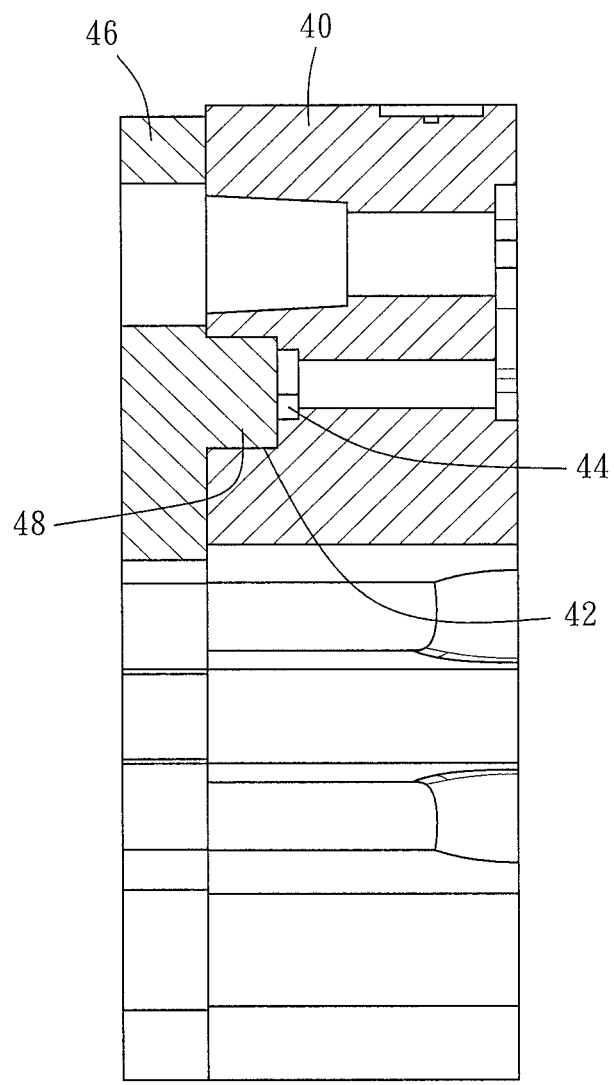
FIG. 9 is a cross-sectional view of the adjustable lubrication module assembled according to the second embodiment of the present invention.

Referring to FIG. 7 and FIG. 8, the second embodiment of the present invention is identical to the first embodiment of the present invention in terms of the arrangement of the oiling channels and the fact that the end lid 40 is integrally formed, except for technical features in the second embodiment of the present invention as follows: a receiving chamber 42 is disposed on the outer end surface (which faces away from the slider 14) of the end lid 40; an oil-guiding conduit 44 is disposed on the wall of the receiving chamber 42; a receiving portion 48 is disposed on an inner end surface (which faces the end lid 40) of an oil scraper 46; and the oil scraper 46 is fitted in the receiving chamber 42 of the end lid 40 by the receiving portion 48, as shown in FIG. 9, so that the oil scraper 46 further enhances the hermetic seal provided to the oil-guiding conduit 44. Moreover, the second embodiment is identical to the first embodiment in that the oil scraper 46 is demounted in order to begin assembly and use the oil stopping component 38.

Figure 10:
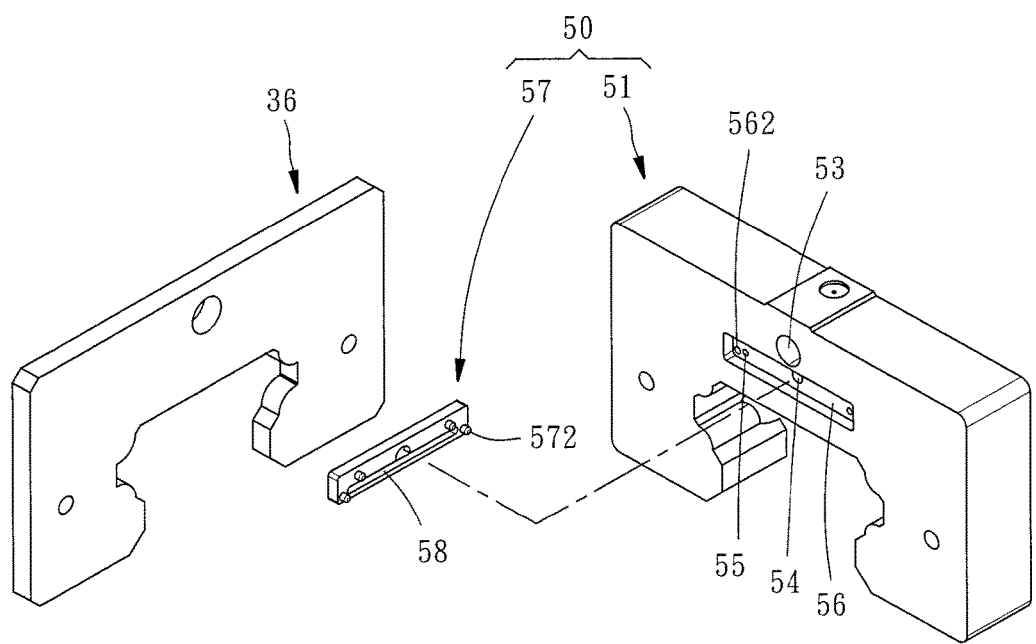
FIG. 10 is a perspective exploded view of the adjustable lubrication module according to the third embodiment of the present invention.
Figure 11:
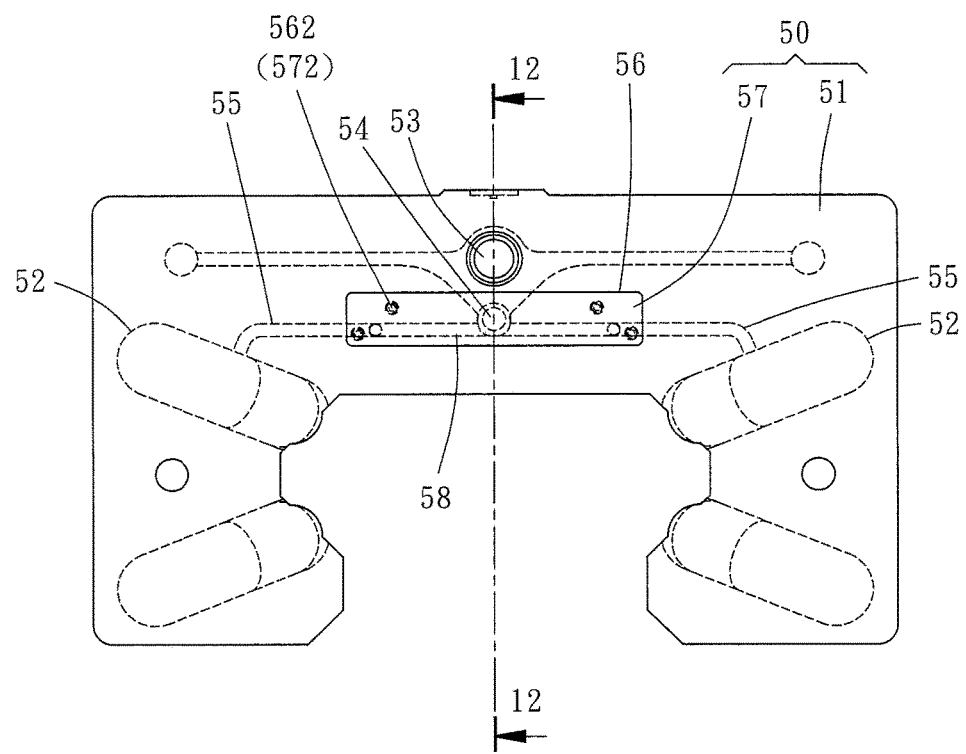
FIG. 11 is a plan of an end lid of the adjustable lubrication module according to the third embodiment of the present invention.
Figure 12:
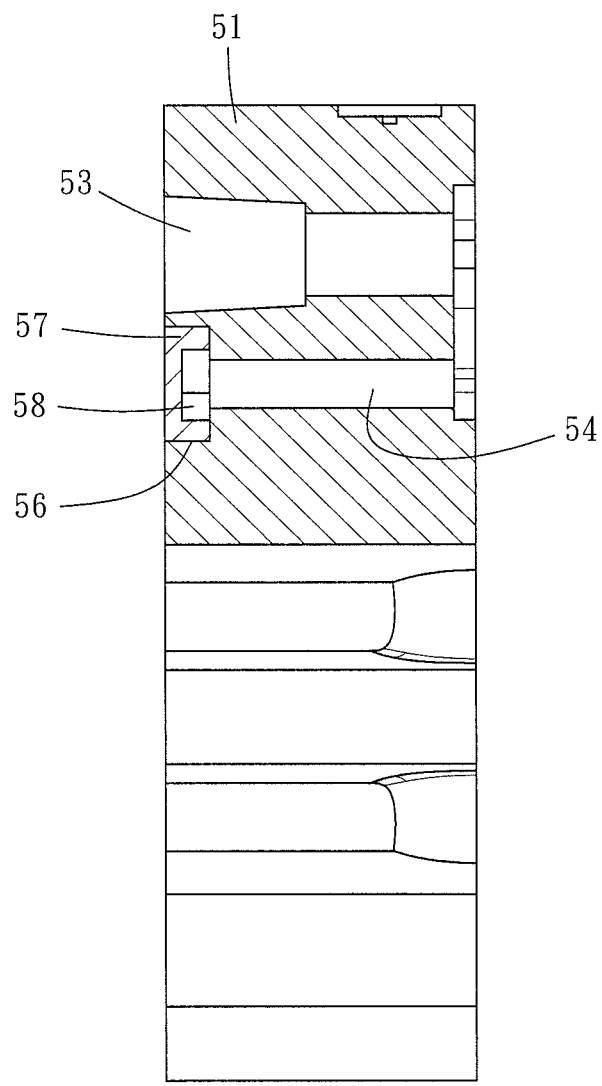
FIG. 12 is a cross-sectional view taken along line 12-12 of FIG. 11.

Referring to FIGS. 10 through 12, the third embodiment of the present invention is identical to the first embodiment of the present invention in terms of the arrangement of the oiling channels and the structure of the oil scraper 36, except for a technical feature in the third embodiment of the present invention as follows: the end lid 50 is a two-piece structure. The end lid 50 has an end lid body 51 and an oil-guiding plate 57. The end lid body 51 is fixed to an end surface of the slider 14 and has two backflow chambers 52, a feed hole 53, a primary oiling channel 54, and two (left and right) opposing secondary oiling channels 55. The structural relationships among the aforesaid components are common features of first and third embodiments of the present invention. Moreover, a receiving chamber 56 is disposed on an outer end surface (that is, an end surface of the end lid body 51, with the end surface facing away from the slider 14) of the end lid body 51. The receiving chamber 56 is in communication with the primary oiling channel 54 and the secondary oiling channels 55. Positioning holes 562 are disposed on the wall of the receiving chamber 56. An oil-guiding conduit 58 and positioning portions 572 in the vicinity of the oil-guiding conduit 58 are disposed on an inner end surface (that is, an end surface of the oil-guiding plate 57, with the end surface facing the end lid body 51) of the oil-guiding plate 57. The oil-guiding plate 57 is fitted in the receiving chamber 56 of the end lid body 51 and mounted in place by the positioning portions 572 insertedly fastened to the positioning holes 562 of the end lid body 51, respectively; hence, after the oil-guiding plate 57 has been mounted on the end lid body 51, the oil-guiding conduit 58 is in communication with the primary and secondary oiling channels 54, 55 of the end lid body 51. Furthermore, in this embodiment, the oil scraper 36 and the oil-guiding plate 57 are consecutively removed to begin assembly and use the oil stopping component 38.

Figure 13:
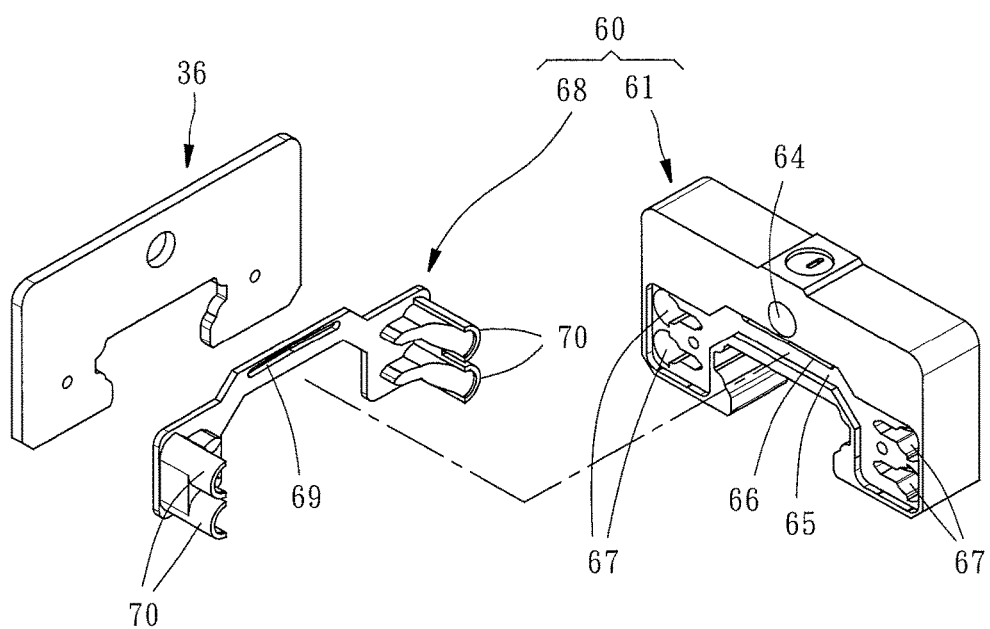
FIG. 13 is a perspective exploded view of the adjustable lubrication module according to the fourth embodiment of the present invention.
Figure 14:
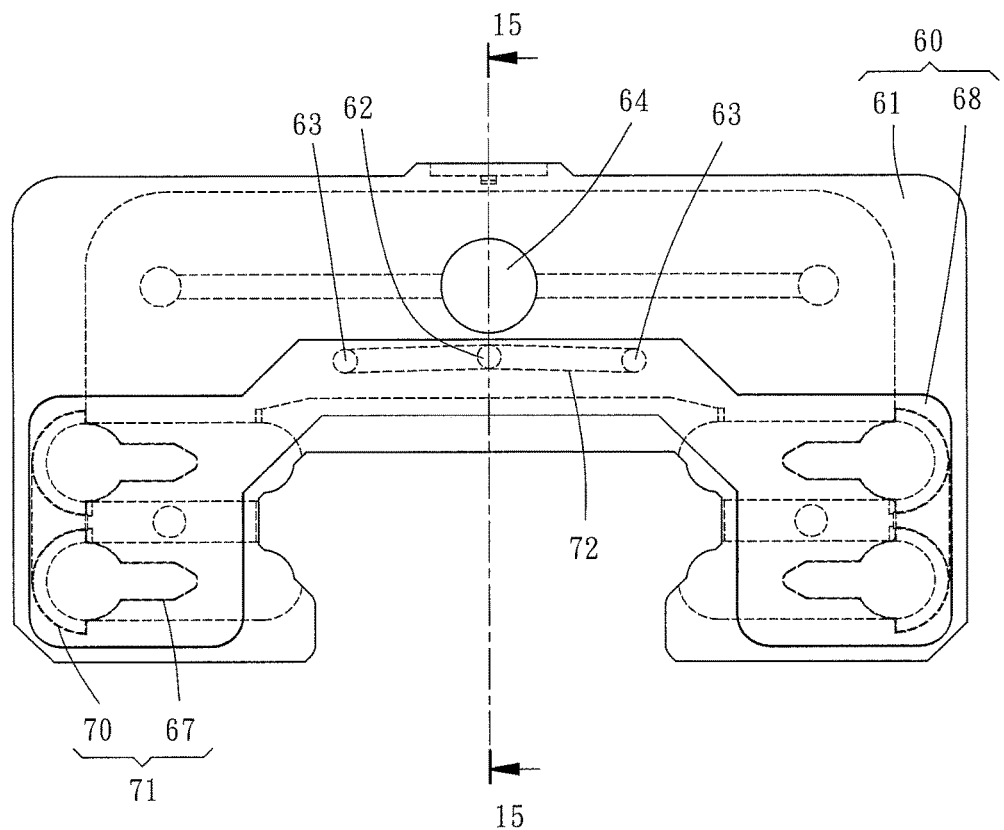
FIG. 14 is a plan of an end lid of the adjustable lubrication module according to the fourth embodiment of the present invention.
Figure 15:
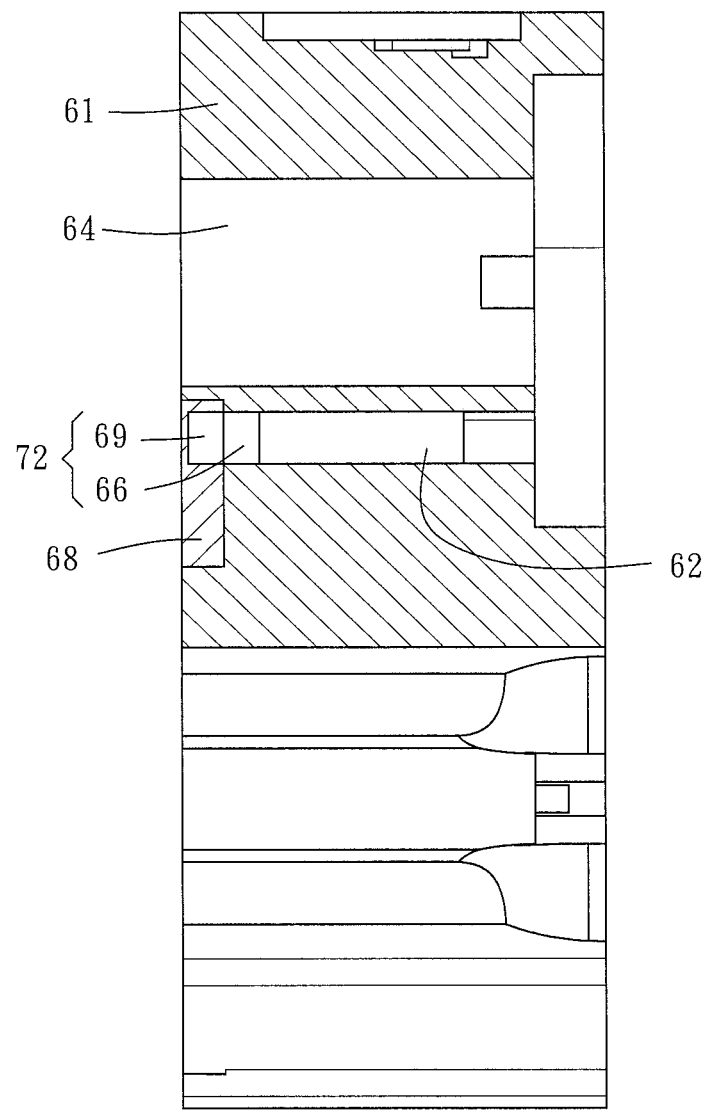
FIG. 15 is a cross-sectional view taken along line 15-15 of FIG. 14.

Referring to FIG. 13 through FIG. 15, the fourth embodiment of the present invention is identical to the first embodiment of the present invention in terms of the arrangement of the oiling channels and the structure of the oil scraper 36, and the fourth embodiment of the present invention is identical to the third embodiment of the present invention in terms of the fact that the end lid 60 is a two-piece structure except for technical features in the fourth embodiment as follows: the end lid 60 has an end lid body 61 and an outer end lid 68; the end lid body 61 has therein a primary oiling channel 62 and two left right opposing secondary oiling channels 63; a feed hole 64 and a receiving chamber 65 disposed below the feed hole 64 are disposed on an outer end surface (that is, an end surface of the end lid body 61, with the end surface facing away from the slider 14) of the end lid body 61; the receiving chamber 65 is in communication with the primary oiling channel 62 and the secondary oiling channels 63; a first half-oil-guiding conduit 66 and two first half-backflow chambers 67 are disposed on the wall of the receiving chamber 65; the outer end lid 68 is fitted in the receiving chamber 65 of the end lid body 61; and a second half-oil-guiding conduit 69 and two second half-backflow chambers 70 are disposed on an inner end surface (that is, an end surface of the outer end lid 68, with the end surface facing the end lid body 61) of the outer end lid 68. Therefore, after the outer end lid 68 has been mounted on the end lid body 61, the second half-backflow chambers 70 of the outer end lid 68 and the first half-backflow chambers 67 of the end lid body 61 are connected to jointly form a backflow chamber 71. Moreover, the second half-oil-guiding conduit 69 of the outer end lid 68 and the first half-oil-guiding conduit 66 of the end lid body 61 are connected so as to jointly form an oil-guiding conduit 72 therebetween, which is applicable to a downsized linear guideway. Furthermore, in this embodiment, the oil scraper 36 and the outer end lid 68 are consecutively removed to begin assembly and use the oil stopping component 38.

In conclusion, regardless of whether a linear guideway is horizontally mounted or side-mounted, an adjustable lubrication module of the present invention is always effective in performing an oil feeding operation. If the linear guideway is side-mounted while oil feeding is ongoing, it is not necessary to demount the end lid in order to mount an oil stopping component in place and thereby control the oil level. Therefore, the present invention not only features ease of mounting and demounting but also prevents ball missing. Moreover, a feed hole and an oil-guiding conduit are disposed on an outer end surface of the end lid rather than at the junction of the end lid and a slider; hence, lubrication oil is prevented from flowing over the gap between the end lid and the slider while oil feeding is ongoing, so as to prevent oil leakage.

What is claimed is:

1. A lubrication module of a linear guideway, the linear guideway comprising a rail and a slider slidably disposed at the rail, the lubrication module comprising:
   an end lid disposed on an end surface of the slider, the end lid having therein two backflow chambers, the two backflow chambers being disposed to respectively face two sides of the rail, a feed hole and an oil-guiding conduit being disposed on an end surface of the end lid, with the end surface of the end lid facing away from the slider, the oil-guiding conduit being closer to the rail than the feed hole, the end lid having therein a primary oiling channel and two secondary oiling channels, two ends of the primary oiling channel being in communication with the feed hole and the oil-guiding conduit, respectively, and two ends of each said secondary oiling channel to be in communication with the oil-guiding conduit and one of the backflow chambers, respectively; and
   an oil scraper disposed on the end surface of the end lid and having an oil feeding inlet, wherein the oil feeding inlet is in communication with the feed hole of the end lid.

2. The lubrication module of a linear guideway according to claim 1, further comprising an oil stopping component demountably disposed in the oil-guiding conduit of the end lid and between the primary oiling channel of the end lid and one of the secondary oiling channels of the end lid.

3. The lubrication module of a linear guideway according to claim 1, wherein a receiving chamber is disposed on the end surface of the end lid, with the oil-guiding conduit disposed on a wall of the receiving chamber, and a receiving portion is disposed on an end surface of the oil scraper, with the end surface of the oil scraper facing the end lid, the receiving portion being fitted in the receiving chamber of the end lid.

4. The lubrication module of a linear guideway according to claim 1, wherein the end lid has an end lid body and an oil-guiding plate, the end lid body having the two backflow chambers, the feed hole, the primary oiling channel, and the two secondary oiling channels, with a receiving chamber disposed on the end surface of the end lid body, the receiving chamber being in communication with the primary oiling channel and the two secondary oiling channels, the oil-guiding plate being fitted in the receiving chamber of the end lid body, the oil-guiding conduit is formed within an end surface of the oil-guiding plate, the end surface of the oil-guiding plate facing the end lid.

5. The lubrication module of a linear guideway according to claim 4, wherein a positioning hole is disposed on a wall of the receiving chamber of the end lid body, and a positioning portion is disposed on the end surface of the oil-guiding plate, the positioning portion being fitted in the positioning hole.

6. A lubrication module of a linear guideway, the linear guideway comprising a rail and a slider slidably disposed at the rail, the lubrication module comprising:

an end lid has an end lid body and an outer end lid, the end lid body disposed on an end surface of the slider, the end lid body having a primary oiling channel and two secondary oiling channels, a feed hole and a receiving chamber disposed below the feed hole being disposed on an end surface of the end lid body, the receiving chamber being in communication with the primary oiling channel and the two secondary oiling channels, a first half-oil-guiding conduit and two first half-backflow chambers being disposed on a wall of the receiving chamber, with the outer end lid fitted in the receiving chamber, two second half-backflow chambers and a second half-oil-guiding conduit being disposed on an end surface of the outer end lid, the two second half-backflow chambers being connected to the first half-backflow chambers, respectively to jointly form one of two backflow chambers, and the second half-oil-guiding conduit being connected to the first half-oil-guiding conduit to jointly form an oil-guiding conduit; the oil-guiding conduit being closer to the rail than the feed hole, two ends of the primary oiling channel being in communication with the feed hole and the oil-guiding conduit, respectively, and two ends of each said secondary oiling channel to be in communication with the oil-guiding conduit and one of the backflow chambers, respectively; and an oil scraper disposed on an end surface of the end lid and having an oil feeding inlet, wherein the oil feeding inlet is in communication with the feed hole of the end lid body.

* * * * *